US008832331B2

(12) United States Patent
Co (10) Patent No.: US 8,832,331 B2
(45) Date of Patent: Sep. 9, 2014

(54) DATA MODIFICATION FOR DEVICE COMMUNICATION CHANNEL PACKETS

(75) Inventor: Stephen Co, Toronto (CA)

(73) Assignee: ATI Technologies ULC (CA)

( * ) Notice: Subject to any disclaimer, the term of this patent is extended or adjusted under 35 U.S.C. 154(b) by 406 days.

(21) Appl. No.: 13/220,326

(22) Filed: Aug. 29, 2011

(65) Prior Publication Data

US 2013/0054850 A1 Feb. 28, 2013

(51) Int. Cl.
*G06F 3/00* (2006.01)
*G06F 13/00* (2006.01)
*G06F 13/38* (2006.01)

(52) U.S. Cl.
USPC .................................. 710/30; 710/33; 710/68

(58) Field of Classification Search
None
See application file for complete search history.

(56) References Cited

U.S. PATENT DOCUMENTS

| 5,974,471 | A * | 10/1999 | Belt .................................. 710/1 |
| 7,290,134 | B2 | 10/2007 | Buer et al. |
| 7,596,155 | B2 | 9/2009 | Hsiao |
| 7,710,969 | B2 | 5/2010 | Szczepanek |
| 7,765,357 | B2 | 7/2010 | Ogawa |
| 7,849,242 | B2 | 12/2010 | Lee |
| 7,917,680 | B2 | 3/2011 | Locker |
| 7,957,294 | B2 | 6/2011 | Choi |
| 7,965,843 | B1 | 6/2011 | Maino et al. |
| 2007/0025374 | A1 | 2/2007 | Stefan et al. |
| 2009/0006711 | A1 | 1/2009 | Biran |
| 2009/0144478 | A1 | 6/2009 | Locker |
| 2010/0011146 | A1 | 1/2010 | Saghi |
| 2010/0169892 | A1 * | 7/2010 | Stam et al. .................... 718/105 |
| 2010/0250823 | A1 | 9/2010 | Suganuma |
| 2011/0004816 | A1 | 1/2011 | Wood |
| 2011/0029696 | A1 | 2/2011 | Uehara |
| 2011/0113115 | A1 * | 5/2011 | Chang et al. .................. 709/213 |
| 2011/0145469 | A1 | 6/2011 | Choi |
| 2011/0153906 | A1 | 6/2011 | Suzuki |
| 2011/0206051 | A1 | 8/2011 | Suzuki |

FOREIGN PATENT DOCUMENTS

DE 10163310 7/2003

OTHER PUBLICATIONS

International Search Report and Written Opinion in Application No. PCT/CA2012/000786 dated Dec. 3, 2012, 8 pages.
Unknown Author, PCI Express—An Overview of the PCI Express Standard, NI Developer Zone, web page with stated published date of Aug. 13, 2009.

* cited by examiner

*Primary Examiner* — Zachary K Huson
(74) *Attorney, Agent, or Firm* — Meyertons, Hood, Kivlin, Kowert & Goetzel, P.C.

(57) ABSTRACT

Techniques are disclosed relating to modifying packet data to be sent across a communication link and/or bus. Data may be modified in accordance with one or more data processing algorithms, and according to the capabilities of a destination device to receive such modified data. Lossless compression algorithms may be used on data in order to achieve a higher effective bandwidth over a particular bus or link. Encryption algorithms may be used, as well as data format conversion algorithms. One or more processing elements of a communication channel controller or other structure within a computing device may be used to modify packet data, which may be in PCI-Express format in some embodiments. A packet prefix or header may be used to store an indication of what algorithm(s) has been used to modify packet data so that a destination device can process packets accordingly.

20 Claims, 5 Drawing Sheets

DATA MODIFICATION FOR DEVICE COMMUNICATION CHANNEL PACKETS

BACKGROUND

1. Technical Field

This disclosure relates to transmission of data packets via a device communication channel, and more specifically, to applying processing algorithms on those data packets.

2. Description of the Related Art

During operation of a computing device, data packets may be sent between devices attached to a communication link and/or bus. A computer processor may send data to (or receive data from) a hard drive or other storage unit, for example. Data that is sent to or from a device may be transmitted in accordance with a particular format, such as the TLP (Transaction Layer Packet) defined in the PCI-Express Specification. Transported data may be in raw or unprocessed form; that is, no operations may have been performed on the data for purposes of transmission prior to it being sent over a communication link and/or bus.

Accordingly, busses and communication links that are configured to transport data in a particular format may be limited to any shortcomings that are present for that format. For example, it may be impossible to achieve or exceed a maximum bandwidth over a particular communication link and/or bus, and devices configured to send and receive packets in the particular format may not be performance efficient in terms of handling packet data.

SUMMARY OF THE EMBODIMENTS

Various embodiments of methods and structures that allow a processing element to modify packet data are disclosed herein.

In one embodiment described, an apparatus is disclosed, comprising a processing element configured to couple to a communication link, wherein the processing element is configured to, in response to receiving payload data destined for a device coupled to the communication link, modify the received payload data according to one or more specified processing algorithms, create one or more packets, wherein the one or more packets are addressed to the device and include the modified payload data and information indicating the one or more specified processing algorithms, and cause the one or more packets to be transmitted to the device via the communication link.

Another embodiment includes a computer-readable storage medium, where the medium has instructions stored thereon that are executable by a processor of a computing device to cause the computing device to perform operations comprising receiving a request to transfer application data to a peripheral device coupled to a communication link of the computing device, wherein the communication link is configured to transfer packets according to a first communication protocol, and, based on an indication that the peripheral device is configured to receive, via the communication link, data packets processed in accordance with a specified algorithm, causing the application data to be modified according to the specified algorithm, and causing the modified application data to be sent in one or more packets to the peripheral device via the communication link, wherein the one or more packets are compatible with the first communication protocol.

Yet another embodiment is a method that comprises a processing element, in response to receiving data destined for a device coupled to a communication link that is also coupled to the processing element, creating one or more data packets that include modified payload data, wherein the modified payload data is a result of processing the received data according to one or more specified processing algorithms, wherein the one or more packets are addressed to the device, and, causing the one or more packets and information indicating the one or more specified processing algorithms to be transmitted to the device via the communication link.

Yet another embodiment comprises a non-transitory computer readable storage medium comprising a data structure which is usable by a program executable on a computer system to perform a portion of a process to fabricate an integrated circuit including circuitry described by the data structure, the circuitry described in the data structure including a processing element configured to couple to a communication link, wherein the processing element is configured to, in response to receiving payload data destined for a device coupled to the communication link, modify the received payload data according to one or more specified processing algorithms, create one or more packets, wherein the one or more packets are addressed to the device and include the modified payload data and information indicating the one or more specified processing algorithms, and cause the one or more packets to be transmitted to the device via the communication link.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising" or "Including." These terms are open-ended. As used in the appended claims, these terms do not foreclose additional structure or steps. Consider a claim that recites: "An apparatus comprising one or more processing elements . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. Further, "configured to" may include adapting a manufacturing process (e.g., a semiconductor fabrication facility) to fabricate devices (e.g., integrated circuits) that are adapted to implement or perform one or more tasks.

"Processing Element." This term has its ordinary and accepted meaning in the art, and includes a device (e.g., circuitry) or combination of devices that is capable of executing computer instructions. A processing element may, in various embodiments, refer to, but is not limited to, a single-core processor, a core of a multi-core processor, or a group of two or more cores of a multi-core processor.

"Processor." This term has its ordinary and accepted meaning in the art, and includes a device that includes one or more processing elements. A processor may refer, without limitation, to a central processing unit (CPU), a co-processor, an arithmetic processing unit, a graphics processing unit, a digital signal processor (DSP), etc.

"Computer-readable Medium." As used herein, this term refers to a (nontransitory, tangible) medium that is readable by a computer or computer system, and includes magnetic, optical, and solid-state storage media such as hard drives, optical disks, DVDs, volatile or nonvolatile RAM devices, holographic storage, programmable memory, etc. The term "non-transitory" as applied to computer readable media herein is only intended to exclude from claim scope any subject matter that is deemed to be ineligible under 35 U.S.C. §101, such as transitory (intangible) media (e.g., carrier waves), and is not intended to exclude any subject matter otherwise considered to be statutory.

Figure 1:
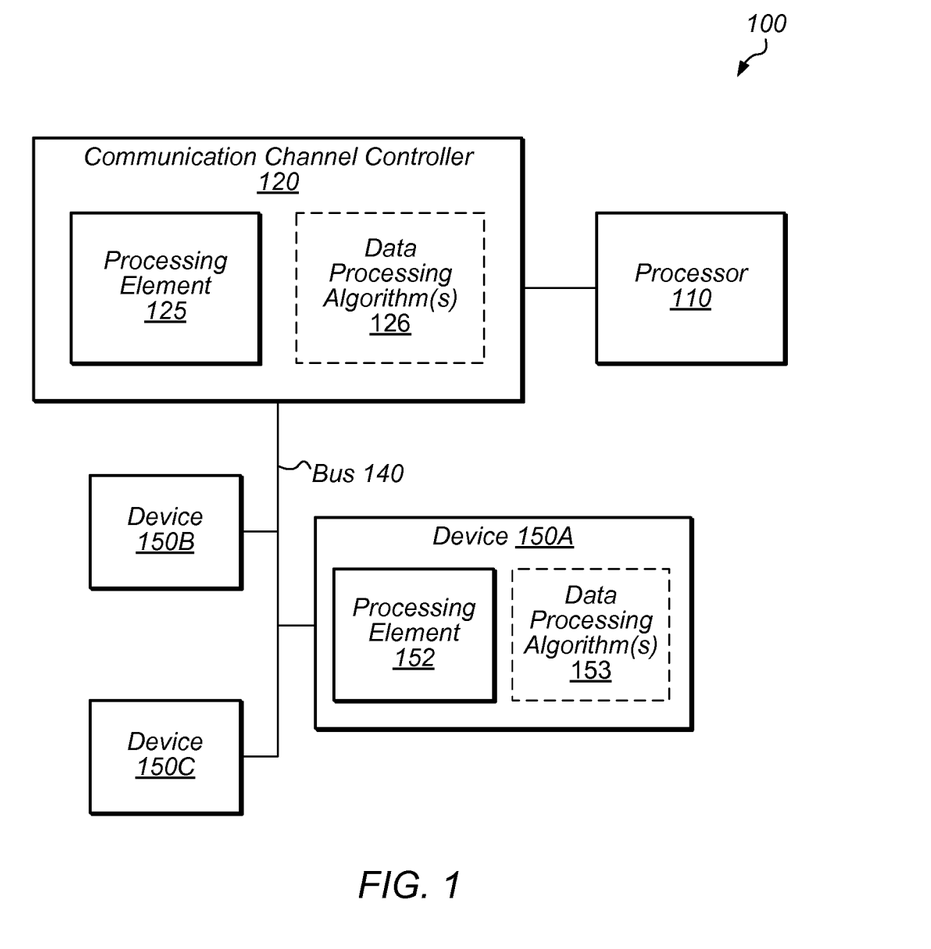
FIG. 1 is a block diagram illustrating one embodiment of a computer system.

Turning now to FIG. 1, one embodiment of a system 100 is shown. In this embodiment, a processor 110 is connected to a communication channel controller 120 that includes processing element 125 and one or more data algorithms 126. As shown, communication channel controller 120 is connected to devices 150 via a bus 140. Device 150A includes processing element 152 and one or more data algorithms 153 in the embodiment of FIG. 1.

Note that in some embodiments, communication channel controller 120 may be configured to control, use, and/or manage one or more device communication channels. The term "communication channel," as used herein, may refer to a shared bus configured to allow communication between two or more devices, or to a point to point communication link configured to allow communication between only two (device) points. In various embodiments, communication channel controller 120 may thus be configured to control, use, and/or manage a publicly shared bus and/or one or more non-shared (point to point) communication links. Note that in at least one embodiment, a communication channel controller may be accessible to a plurality of devices via a plurality of communication links, though the plurality of devices may not be able to access each other directly. (Accordingly, in various embodiments, channel controller 120 may be configured to facilitate communications between two or more devices connected to the channel controller via a respective plurality of communication links.)

Figure 5:
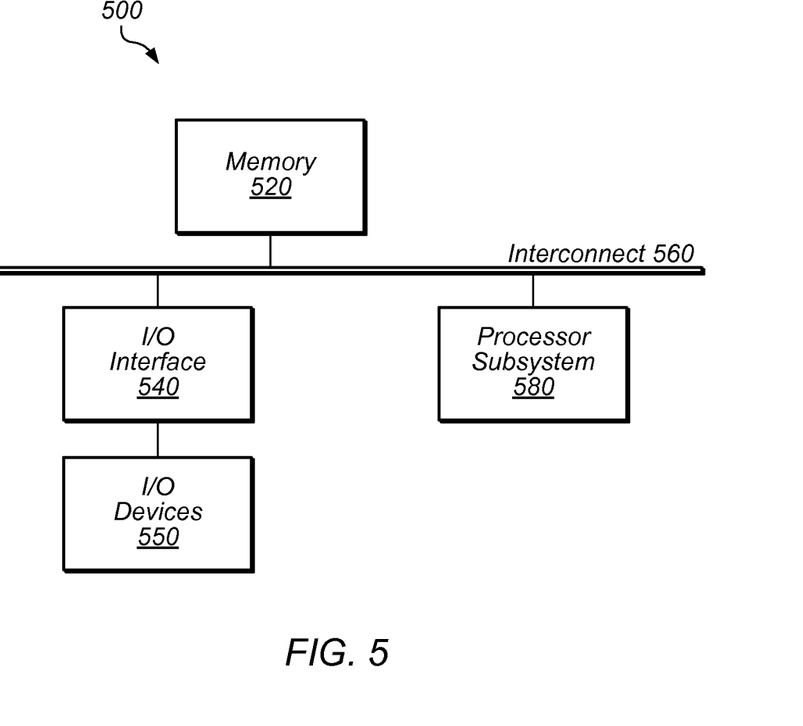
FIG. 5 is a block diagram illustrating another embodiment of a computer system.

Processor 110 may be any processor, and in one embodiment, processor 110 is a processor as described with respect to processor subsystem 580 of FIG. 5. Processor 110 may include one or more processing cores and may support execution of multiple threads in various embodiments. As shown, processor 110 is connected to a communication channel controller 120. This connection may be a bus such as 140 or any other suitable connection. Accordingly, processor 110 may be configured to send data to or receive data from communication channel controller 120. Data sent to communication channel controller 120 by processor 110 may be destined for one, any, or all of devices 150 in some embodiments. As such, processor 110 may send an indication to communication channel controller 120 of the particular device 150 to which data is destined. This indication may be an address, an interrupt, other identifying information (e.g., logical or hardware device number), or any combination thereof in various embodiments.

Data may be sent to communication channel controller 120 in a variety of ways, and according to techniques that may be known to those of skill in the art. In one embodiment, processor 110 is configured to send data directly to communication channel controller 120 (i.e., transmit data that is already stored in processor 110 to communication channel controller 120). In other embodiments, processor 110 may instead cause data to be sent by communicating a location of data to communication channel controller 120—for example, sending a memory location or other pointer to the communication channel controller. Communication channel controller could then use the pointer to access, e.g., data stored in system memory such as RAM. Indeed, in various embodiments, communication channel controller 120 may acquire data from any number of sources and using any number of techniques. For example, a device such as 150A may use some or all of the functionality of communication channel controller 120 to send data to processor 110, to another device 150, and/or to other structures within a computer system or computing device via communication channel controller 120.

Devices 150 may be any peripheral device, such as a hard drive, Flash memory drive, storage array, SAN, other storage device, or a controller associated therewith; a network interface device (e.g., to a local or wide-area network); a DVD-ROM drive or other optical drive; or other devices (e.g., graphics processing device, user interface device, etc.). Accordingly, in some embodiments, a device 150 may have any or all of the features of an I/O device 550 and/or I/O interface 540 as described below relative to FIG. 5.

In the embodiment of FIG. 1, communication channel controller 120 is configured to receive data and create one or more packets for its transmission via bus 140. In particular, data packets may be created in the embodiment of FIG. 1 using processing element 125. Processing element 125 may be a standalone processor, a core of a multi-core processor, or other hardware logic. In some embodiments, all or a portion of processing element 125 is programmable hardware (e.g., an EEPROM, etc.) All or a portion of processing element 125 may be a custom ASIC chip in some embodiments. Processing element 125 may also be configured to include algorithms 126 in some embodiments, as discussed below, and may be reprogrammed or updated with new algorithms in these embodiments.

Processing element 125 is configured to formulate data packets according to one or more communication protocols in various embodiments. As shown in FIG. 1, processing element 125 is configured to formulate data packets according to the PCI-Express Specification, version 2.1. In other embodiments, processing element 125 is configured to formulate data packets according to other versions of the PCI-Express Specification. In yet other embodiments, other communication protocols may be used by processing element 125 to packetize data, and in some embodiments, processing element 125 may support data packetization according to two or more different protocols and/or two or more versions of the same protocol. Protocols that may be used in various embodiments also include USB, Ethernet, DisplayPort, TCP, and UDP, or any other communication protocol that uses packet-based transmission of data. Data packets formulated by processing element 125 may contain a data payload in various embodiments, as well as any other data packet field or data packet feature as discussed below relative to FIG. 2.

One or more data processing algorithms 126 may be used by processing element 125 to formulate a data packet. Thus in one embodiment, a data processing algorithm is executed by processing element 125 on payload data to be communicated to a device 150 coupled to bus 140 (or another bus or link not depicted). In one embodiment, processing element 125 is configured to modify packet payload data based on an indication that a device 150 is configured to process data that has been modified in accordance with one or more of algorithms 126.

In the embodiment of FIG. 1, algorithms 126 are stored within hardware logic that has been programmed into communication channel controller 120 (i.e., algorithms 126 may be hardwired into circuitry/circuit structures). In one embodiment, algorithms are stored as logic that has been programmed into processing element 125. In various embodiments, execution of one or more data processing algorithms 126 can thus be effectuated by circuitry that is configured to perform one or more operations that make up a particular algorithm. In other embodiments, algorithms 126 may be stored as instructions on a computer-readable storage medium. The instructions may be executable by a processing element such as 125, one or more cores of a processor such as processor 110, etc. Accordingly, execution of one or more data processing algorithms 126 can be effectuated, in some embodiments, by instructions being executed by a general purpose processing element or other processing element (GPU, GPU core, other co-processor, customized or specialty chip, etc.) In one embodiment, one or more cores of processor 110 may execute instructions for algorithms 126.

Data processing algorithms 126 may include any number of algorithms that, when executed, alter data (e.g., packet payload data) in a variety of manners. In some embodiments, one or more algorithms for lossless data compression are included in algorithms 126. Such lossless compression algorithms may include Lempel-Ziv-Welch (LZW) compression, run-length encoding, byte-pair encoding, and/or dictionary based encoding schemes. In some embodiments, a customized lossless compression scheme based on observed data (e.g., a heuristic based scheme) may be used. For example, bus traffic in one or more particular environments or computer devices may be sampled empirically, and then based on this data, one or more advantageous schemes (or combinations of schemes) may be used. If it is observed, for example, that a particular pattern of one or more values is frequently transmitted, a lossless compression scheme may incorporate those patterns. Any public-domain or manufacturer-specific scheme may be used for lossless compression in various embodiments, and the number of encoding/decoding schemes that can be used to compress data is not limited to those described above. In some embodiments, lossy compression schemes may be used (particularly in connection with file format conversion algorithms, as discussed below).

In one embodiment, the type of compression algorithm that is used may depend on an indication of the kind of data that is being compressed. A text-based file (Microsoft Word™, plain text, rich text format (RTF), etc.) that is being sent over bus 140 may, for example, have a different compression scheme or algorithm applied to it than would be applied to a graphics-based file (JPEG, MPEG, etc.) being transmitted over bus 140. The indication of the type of data to be transmitted via a bus may be explicitly generated or provided by a structure outside communication channel controller 120 (e.g., by processor 110 or a device 150) in one embodiment. The indication may be generated by processing element 125 inspecting data to be transmitted in another embodiment to determine the data's type. The data type indication may also be provided by one or more other components (not depicted) in communication channel controller 120. Accordingly, in one embodiment, processing element 125 is configured to modify payload data based on an indication that a device coupled to bus 140 is configured to uncompress data according to a particular compression algorithm.

One advantage of using compression for data packets to be sent over bus 140 (or another bus or link) is that a higher effective bandwidth can be achieved. For example, a given communication protocol such as the PCI-Express 2.1 Specification may place an upper limit on achievable throughput for a PCI-Express link. That achievable throughput may be bounded by a combination of the size of TLP Payloads, the configuration of the PCI-Express link, and the general traffic transmitted across the link. If compression techniques can be used to reduce the amount of actual bytes being transferred over a bus or link, however, then a higher amount of "useful" data can be sent in the same amount of time. However, use of compression techniques to send data over bus 140 may require, in various embodiments, that a device 150 or other destination for the data packets be capable of uncompressing the compressed data to restore the data to its unmodified form.

Compression is only one application of data processing algorithms (e.g., encoding/decoding algorithms) that can be used on packet data. Other algorithms 126 may include encryption and format translation. In one embodiment in which encryption for data packets is supported, all or a portion of packet data may be encrypted according to one or more encryption schemes. Such schemes may include use of the Digital Signature Algorithm (DSA), RSA (PKCS#1), PGP, password-authenticated key agreement, elliptical curve techniques, or other cryptographic techniques that may occur to one of skill in the art. Accordingly, in some embodiments, communication channel controller 120 and/or processing element 125 (or another structure configured to encrypt data) may be configured to use one or more particular keys to encrypt data. Communication channel controller 120 may be configured to exchange keys with devices 150 and/or other destinations for data sent via bus 140. Use of cryptographic techniques to encode packet payload data may, in some embodiments, prevent the payload data from being "sniffed" as it travels across bus 140 (or another data transportation structure). Encryption may be used to protect sensitive or classified data, media files protected by digital rights management (DRM), or for any other purpose. An encryption policy may be used in some embodiments as a basis for encrypting packet data. Such a policy may specify that some or all data, or some or all types of data, should be encrypted according to one or more algorithms. The encryption policy may consider various factors in determining whether data should be encrypted, such as identity of a user logged onto a computer system, indications provided by a source or destination device (and/or the capabilities of such devices), etc. As discussed below, however, yet other algorithms besides encryption and compression may be used.

Data format translation algorithms may be used in some embodiments to modify data to be sent via bus 140. These algorithms may, for example, convert from one file format to another (e.g., from a GIF graphics file to a JPEG graphics file; from a Flash (.FLV) video format to an MPEG video format), convert from one document format such as rich text format (RTF) or Postscript (PDF) to another document format such as Microsoft Word™), or convert from one audio format to another. Many types of data format conversion are possible, and are not limited to the above examples. In some embodiments, the format conversion may occur at a lower level, such as the byte level or character level (for example, data can be converted between ASCII and EBCDIC character encodings, or between various ISO character encodings). In one embodiment, processing element 125 may convert data from a first format to a second format based on an indication that one of devices 150 requests data in the second format (or that, e.g., processor 110 requests data in the second format for data being transferred from a device 150). For example, an application program running on one or more cores of processor 110 may request that one or more image files be retrieved from a storage device 150 (such as a hard drive) in a particular format (e.g., JPEG image). A processing element within the device 150 may translate data into JPEG format before sending it to the requestor (e.g., processor 110). Accordingly, in some embodiments in which data format translation algorithms are used, one or more memory buffers may be used as temporary storage for the translation process.

Algorithms that may be included in algorithms 126 are not limited to those described above with respect to compression, encryption, and data format translation. Other data processing algorithms that may affect data (e.g., payload data) to be transmitted via bus 140 may also be present in various embodiments. In one embodiment, processing element 125 is configured to, in response to receiving payload data destined to one of devices 150, modify the received payload data according to at least one of algorithms 126, create one or more packets that are addressed to that device and that include the modified payload data, as well as information indicating at least one of the algorithms 126 that was used to modify the data; and to cause the one or more created packets to be transmitted to the device 150 via bus 140. In some embodiments, more than one algorithm can be used on a given data packet payload.

Various embodiments have been described above relative to processing element 125, algorithms 126, and communication channel controller 120 as depicted in FIG. 1, including the creation of bus packets with algorithmically modified payload data. However, in different embodiments, a processing element and/or algorithm(s) may be located within different structures (e.g., structures other than communication channel controller 120), and may affect packet data sent via different busses or links (e.g., a connection other than bus 140). In the embodiment of FIG. 1, for example, device 150A also includes a processing element 152 and data processing algorithm(s) 153. Processing element 152 may have any or all of the features described above with respect to various embodiments of processing element 125, and algorithms 153 may likewise have any or all of the features or characteristics of algorithms 126 as described above. Device 150A may send data packets via bus 140 to any other device 150, to processor 110 via communication channel controller 120, or to other destinations via bus 140 (or other busses or links not depicted). In another embodiment, a processing element such as 125 and algorithms such as 126 may be located within a memory controller, which may be configured to communicate with processor 110, communication channel controller 120, and/or a device 150, either through bus 140 or one or more other busses or links not depicted. A processing core of a CPU may be configured similarly or identical to processing element 125 in one embodiment, while in another embodiment, a processing core of a graphics processing unit (GPU) may be configured similarly or identical to processing element 125. Any device, structure, or apparatus configured to include such a processing element may also include algorithms 126 (or be able to access such algorithms).

Figure 2:
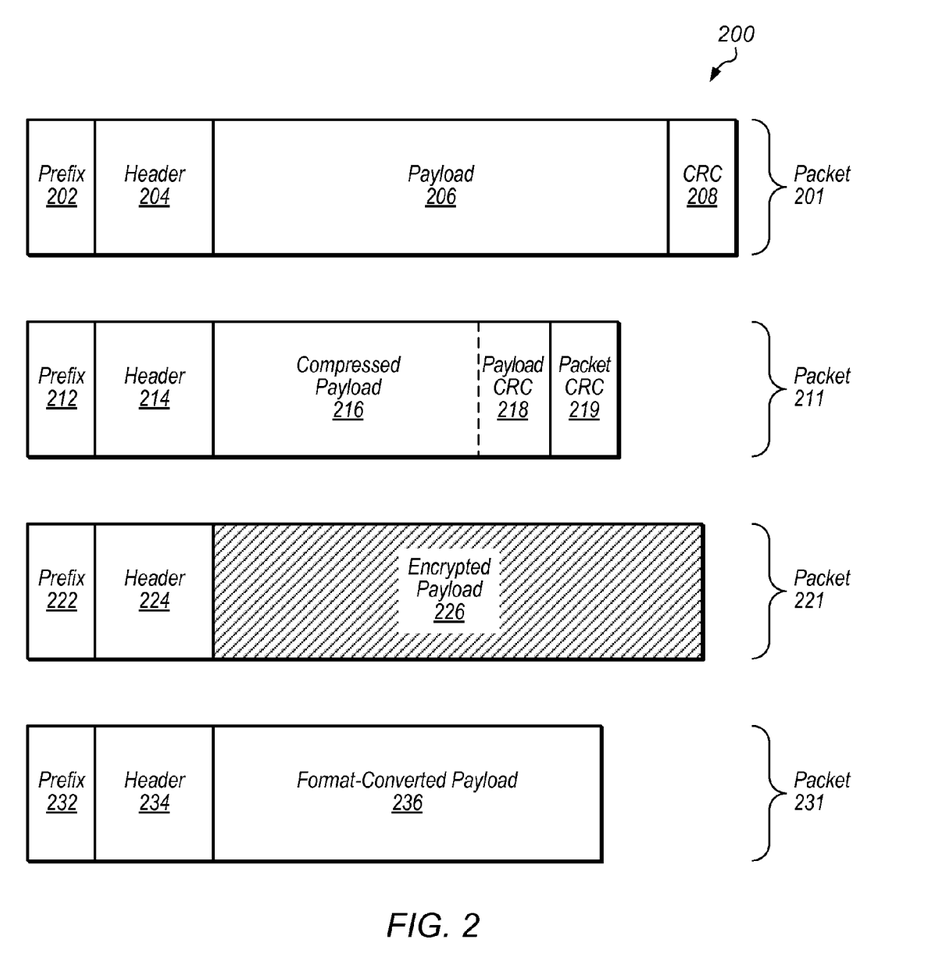
FIG. 2 is a block diagram of several possible data packets.

Turning now to FIG. 2, a block diagram 200 of several data packets is depicted. As shown, FIG. 2 includes data packets 201, 211, 221, and 231. In this embodiment, these packets correspond, respectively, to a baseline ("regular") packet, a compressed payload data packet, an encrypted payload data packet, and a packet in which payload data has been format-converted. In various embodiments, these packets may be formulated by a processing element such as 125 or 152 and transmitted via a bus such as 140. In some embodiments, these packets are Transaction Layer Packets (TLP) adhering to the PCI-Express Specification 2.1 rules (and/or other versions of PCI-Express). In some embodiments, not all depicted packet fields depicted may be present, while in other embodiments, additional packet fields not depicted may be used. In some embodiments, certain fields depicted may be present in some packets but not others. For example, in one embodiment, a prefix field may be present in a first packet destined to a first device, but omitted in other, later transmitted packets. The receiving device may be able to figure out from context or other packet information what a "missing" prefix should be. Accordingly, prefix and/or header compression or omission can be performed in some embodiments. In accordance with the above, packets in various embodiments may include any combination of some or all of the fields and features described with respect to packets 201, 211, 221, and 231. In some embodiments, packet fields may appear in a different order than as shown in FIG. 2.

Packet 201, as shown, includes a prefix 202, header 204, payload 206, and CRC field 208. Prefix 202 may conform to the TLP Prefix as specified in version 2.1 of the PCI-Express Specification, or any other prefix specification for other communication protocols in various embodiments. Header 204 may conform to the TLP Header as specified in any version of the PCI-Express Specification, or any other header specification for other communication protocols in various embodiments. In various embodiments, prefix 202 and/or header 204 may include information indicating the source (device) from which a data packet originated, the destination (device) to which the data packet is destined, the communication protocol (or format) of the data packet, the length of one or more fields of the packet (e.g., prefix length, header length, payload length, CRC length, etc.), the type of encoding used for the packet, routing or path information for the packet, as well as other information. CRC field 208 may include any error check code, and in the embodiment of FIG. 2, includes a cyclic redundancy check (CRC) value that corresponds to all of packet 201 or a portion thereof (e.g., payload 206). Such a value may be used to ensure that the packet was transmitted without error. In some embodiments, other error check codes that are not CRC values may be used.

In some respects, packets 211, 221, and 231 may differ from packet 201. However, the prefix, header, and payload fields of packets 211, 221, and 231 may include any or all of the features described above with respect to prefix 202, header 204, and payload 206, and packets 211, 221, and 231 may also include CRC values or other error check codes. Packets having the format of packets 211, 221, and 231 may be used instead of packets having the format of packet 201 in various embodiments. In particular, after applying one or more specified data processing algorithms (such as algorithms 126), a data packet may have a form as in 211, 221, 231.

Information indicating what algorithm(s) has been used to modify packet data may be stored within a packet in a variety of locations. In some embodiments, this information may be stored in a prefix and/or a header. In other embodiments, this information may be stored within the payload data field (though it may not form an actual part of the payload data itself). Other packet fields or locations may also be used to store information indicative of a data processing algorithm, and may vary by embodiment and according to the particular communication protocol used by a bus or link. In some embodiments, the algorithmic encoding for a TLP payload may be specified by setting certain bits in a TLP formatted prefix. In these embodiments, the bits that are used may be "unused" or "reserved" bits (bits that are not defined in a specification or not yet part of the TLP protocol), or they may be "custom" or "manufacturer" bits that can be defined by end users or reserved for particular manufacturers in accordance with the TLP or other protocols. In one embodiment, information indicating the algorithm that has been or will be used to modify packet data may be sent via a mechanism other than a modified data packet (e.g., an indication may be sent via a separate channel or communication path, or be sent as control information not specifically included in a data packet).

Packet 211 is used for data compression in the embodiment of FIG. 2. As shown, packet 211 includes a prefix 212, header 214, compressed payload 216, payload CRC field 218, and packet CRC field 219. Compressed payload 216 represents packet payload data that has been compressed according to at least one compression algorithm. Accordingly, compressed payload 216 may be of lesser size than an uncompressed payload such as payload 206 of packet 201 (and packet 211 may be of a smaller total size than packet 201). An indication of the algorithm used to compress payload 216 may be stored anywhere within packet 211, including the prefix, header, payload, etc.

Packet CRC field 219 may include any or all of the features of CRC field 208. E.g., packet CRC field 219 may include an error check code for the entirety or a portion of packet 211. Another error check field, payload CRC field 218, may also be included in packet 211. Field 218 may serve a different purpose than field 219 in the embodiment of FIG. 2. Specifically, field 218 may be an error check code that corresponds to the unmodified (not compressed) payload data. Once packet 211 is received, a device could uncompress payload data in field 216, and compare it to the error code value in field 218. Payload CRC field 218 may thus be created by a processing element and include a value corresponding to unmodified payload data, where the value in field 218 is usable by a device receiving that packet to determine whether any errors occurred in modifying payload data according to one or more specified algorithms. Packets 221 and 231 may also have a payload error check field similar to field 218 and packet error check field similar to field 219 (although not specifically depicted in FIG. 2).

Packet 221 is used for data encryption in the embodiment of FIG. 2. As shown, packet 221 includes a prefix 222, header 224, and encrypted payload 226. Encrypted payload 226 represents packet payload data that has been encrypted according to at least one specified encryption algorithm. Encrypted payload 226 may be of a greater or lesser size than an unmodified payload such as payload 206. An indication of the algorithm used to encrypt payload 226 may be stored anywhere within packet 221, including the prefix, header, payload, etc.

A processing element configured to encrypt packets may also be configured to exchange or make use of encryption keys and use other techniques to ensure that a receiving device is authorized and/or capable of decoding encrypted packets.

Packet 231 is used for format conversion in the embodiment of FIG. 2. As shown, packet 231 includes a prefix 232, header 234, and format-converted payload 236. Format-converted payload 236 represents packet payload data that has been converted to a different format (e.g., TIFF image to JPEG image) according to at least one specified format conversion algorithm. Format-converted payload 236 may be of a greater or lesser size than an unmodified payload such as payload 206. An indication of the algorithm used to convert payload 236 (e.g., an indication of the original data format and/or the newly converted data format) may be stored anywhere within packet 231, including the prefix, header, payload, etc. A processing element configured to convert data from one format to another may be configured to do so in response to a request from a receiving device.

Figure 3:
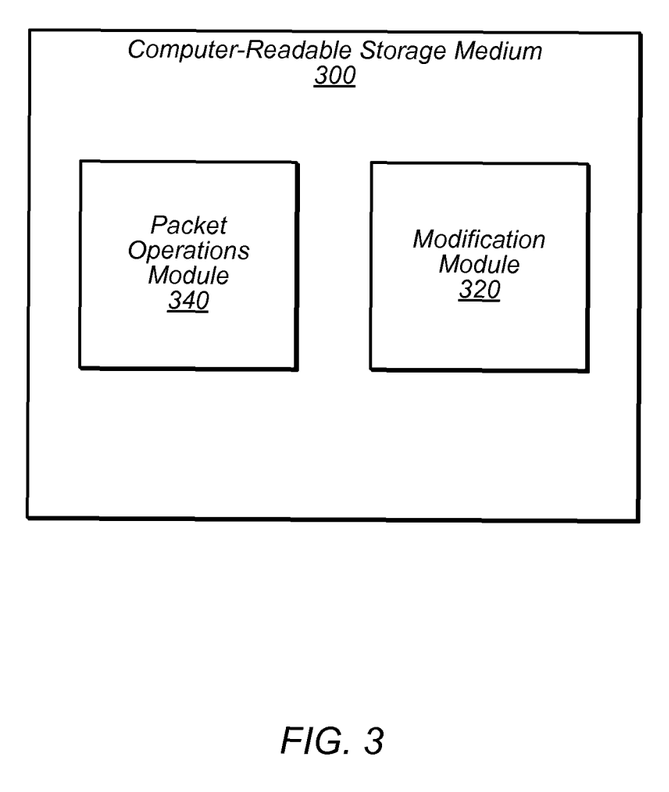
FIG. 3 is a block diagram illustrating a block diagram of a computer-readable storage medium.

Turning now to FIG. 3, a block diagram of computer-readable storage medium 300 is shown. The computer-readable storage media of FIG. 3 may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), holographic storage, as well as storage media accessible via a communication medium such as a network and/or a wireless link.

The computer-readable storage medium of FIG. 3 includes modules 320 and 340 as shown. These modules may include any number of libraries, source files, executables, GUIs, script code, batch files, configuration settings and/or configuration files, as well as other files and/or computer program related objects. These code modules may include, be interpreted from, and/or compiled from one or more different computer-related programming languages, such as C, C++, Java, VHDL, etc. In some embodiments, portions of the code modules may be part of an operating system or other software (e.g., drivers, data format translators, etc.) Also note that in some embodiments, all or a portion of module 320 may be combined into module 340, and vice versa. Module 320 and/or module 340 may be executed, in some embodiments, to cause any of the operations described above with respect to processing elements such as 125.

In the embodiment of FIG. 3, modification module 320 includes instructions executable by a processor to cause packet payload data to be modified according to one or more specified algorithms (e.g., algorithms 126). Accordingly, in some embodiments, modification module 320 includes instructions that when executed, will alter data according to one or more compression, encryption, format translation, and/or other types of algorithms. Packet operations module 340 may include instructions relating to formatting, sending, and/or receiving packets for one or more particular bus or link communication protocols (e.g., PCI-Express, etc.). Accordingly, packet operations module 340 may be configured to formulate one or more packet fields (such as those discussed relative to FIG. 2) for transmission of a packet, to extract information from one or more packet fields (e.g., extract payload data, either modified or unmodified, extract information indicating what algorithm(s) may have been used to modify data, etc.), and to create and send data packets.

Thus, in one embodiment, module 320 and/or module 340 are executable by a processor of a computing device to cause the computing device to perform operations that include receiving a request to transfer application data to a peripheral device coupled to a bus of the computing device. The request may be received from an application running on one or more cores of processor 110, or from other sources, and may specify particular application data to be transferred. This application data may be graphical, textual, etc., and may be in any number of formats. The application data may be generated by the application running on the processor, or by another source. The data may be located within system memory such as RAM and/or one or more storage devices, in various embodiments. The request to transfer application data may specify an identity of a peripheral device such as one of devices 150, and the bus to which that peripheral device is coupled may be configured to transfer packets according to a first communication protocol.

Module 320 and/or module 340 are executable by a processor of a computing device, in one embodiment, to cause the computing device to perform operations that include causing the application data to be modified according to a specified algorithm, and that include causing the modified application data to be sent in one or more packets to the peripheral device via the bus. The one or more packets may be compatible with one or more communication protocols (i.e., may comply with one or more specifications or standards for that communication protocol). Causing the application data to be modified and causing the modified application data to be sent may be performed based on an indication that the peripheral device is configured to receive, via the bus, data packets processed in accordance with the specified algorithm. In some embodiments, the operations may include sending application data to a controller that is configured to modify the application data according to one or more specified algorithms. The controller to which application data is sent may be communication channel controller 120, a memory controller (e.g., one that includes a processing element such as 125), or another type of data controller.

In one embodiment, module 320 and/or module 340 are executable by a processor of a computing device to cause the computing device to perform operations that include sending information indicating a specified data processing algorithm to a controller such as those discussed in the paragraph above. Accordingly, in this embodiment, the controller may be configured to receive such an indication and process payload data appropriately (compressing it, encrypting it, etc.). In some embodiments, the controller may receive information indicating the specified algorithm from processor 110, while in other embodiments, the processor may receive this information from a destination device to which data packets are to be sent via a bus. For example, a hard drive or other peripheral device within a computing device may indicate to the controller that is capable of receiving compressed payload data according to one or more algorithms. In this case, the controller may automatically send data to that hard drive using compression, without having to receive an explicit request from a sender of data such as processor 110.

In one embodiment, sending the application data to a controller may comprise sending an indication of a memory location in which at least a portion of the application data is stored to the controller. For example, rather than directly sending application data, a controller or processing element may receive a memory location and an amount of data to be retrieved from that location.

Figure 4:
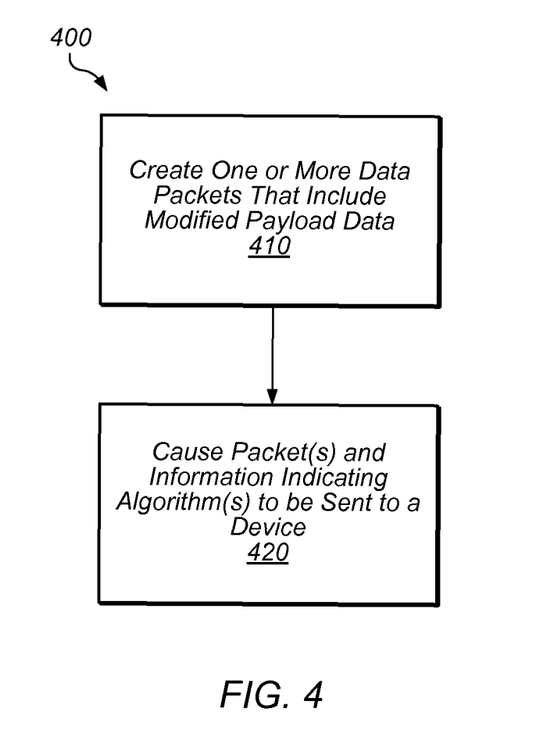
FIG. 4 is a flow diagram illustrating one embodiment of a method in which one or more data packets that include modified payload data are created and sent to a device.

Turning now to FIG. 4, a flow chart of one embodiment of a method 400 is shown. It should be noted that in various embodiments of the method described below, one or more of the elements described may be performed concurrently, in a different order than shown, or may be omitted entirely. Other additional elements may also be performed as desired. Further, only some portions of some method steps may be performed in some embodiments. All or a portion of steps of method 400 may be performed by any combination of processing element 125 and/or communication channel controller 120 in some embodiments. In other embodiments, processor 110 or a device 150 may perform all or a portion of steps of method 400, although method 400 is not thus limited.

In step 410, one or more data packets that include modified payload data are created. These packets may be created by a processing element such as element 125. The modified payload data may be a result of processing the received data according to one or more specified processing algorithms (e.g., algorithms 126), and the one or more packets may be addressed to a destination device. In step 420, a processing element causes the one or more created packets and information indicating the one or more specified processing algorithms to be transmitted to the destination device via the bus. The information indicating the one or more specified algorithms may be stored in a packet prefix included in at least one of the one or more data packets. In other embodiments, this information may be transmitted or conveyed separately from the created one or more data packets. In one embodiment, the one or more specified processing algorithms include an encryption algorithm, and the method further comprises modifying the payload data based on an encryption policy. However, many other embodiments of method 400 are possible and contemplated in accordance with the structures and techniques disclosed herein.

Exemplary Computer System

Turning now to FIG. 5, one embodiment of an exemplary computer system 500 is depicted. All or a portion of computer system 500 may be used to implement any or all portions of the system depicted in FIG. 1.

Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Computer system 500 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 500 may also be any type of networked peripheral device such as storage devices, switches, modems, routers, etc. Although a single computer system 500 is shown for convenience, system 500 may also be implemented as two or more computer systems operating together.

Processor subsystem 580 may include one or more processors or processing units. For example, processor subsystem 580 may include one or more processing units (each of which may have multiple processing elements or cores) that are coupled to one or more resource control processing elements. In various embodiments of computer system 500, multiple instances of processor subsystem 580 may be coupled to interconnect 560. In various embodiments, processor subsystem 580 (or each processor unit or processing element within 580) may contain a cache or other form of on-board memory.

System memory 520 is usable by processor subsystem 580, and comprises one or more memory elements in various embodiments. System memory 520 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on. Memory in computer system 500 is not limited to primary storage such as memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor sub system 580.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device.

Program instructions that are executed by computer systems (e.g., computer system 500) may be stored on various forms of computer readable storage media. Generally speaking, a computer readable storage medium may include any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), holographic storage, as well as storage media accessible via a communication medium such as a network and/or a wireless link.

Hardware embodiments may be generated using hardware generation instructions in some embodiments. For example, hardware generation instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of a processing element (such as 125 and/or 152) that is configured to implement packet modification and/or processing. The netlist may then be placed and routed to produce a data set describing geometric shapes to be applied to masks. The masks may then be used in various semiconductor fabrication steps to produce a semiconductor circuit or circuits corresponding to one or more processing elements and/or controller such as communication channel controller 120 or a memory controller. Alternatively, the database may be the netlist (with or without the synthesis library) or the data set, as desired. Thus, hardware generation instructions may be executed to cause processors and/or processing elements that implement the above-described methods and techniques to be generated or created according to techniques known to those with skill in the art of fabrication. Additionally, such hardware generation instructions may be stored on any suitable computer-readable medium.

Accordingly, in one embodiment, a non-transitory computer readable storage medium comprising a data structure which is usable by a program executable on a computer system to perform a portion of a process to fabricate an integrated circuit including circuitry described by the data structure is disclosed, the circuitry described in the data structure including a processing element configured to couple to a bus, wherein the processing element is configured to, in response to receiving payload data destined for a device coupled to the bus modify the received payload data according to one or more specified processing algorithms, create one or more packets, wherein the one or more packets are addressed to the device and include the modified payload data and information indicating the one or more specified processing algorithms, and cause the one or more packets to be transmitted to the device via the bus. In a further embodiment, the non-transitory computer readable storage medium stores at least one of HDL, Verilog, or GDSII data. The circuitry that may be fabricated in these embodiments may include any or all features described herein, and is not limited to the above paragraph.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:
1. An apparatus, comprising:
a processor, comprising a processing element that is configured to couple to a communication channel;
wherein the processing element is configured to, in response to information indicating that a device coupled to the communication channel is configured to take one or more specific actions on any received payload data that has been modified according to one or more specified processing algorithms:
modify received payload data according to the one or more specified processing algorithms;
create one or more packets, wherein the one or more packets are destined to the device and include the modified payload data and information indicating the one or more specified processing algorithms that were used to modify the payload data; and
cause the one or more packets to be transmitted to the device via the communication channel.

2. The apparatus of claim 1, wherein the one or more specific actions include performing operations on the modified payload data to revert the modified payload data back to an original form of the payload data.

3. The apparatus of claim 1, wherein the one or more specified processing algorithms include a lossless compression algorithm, and wherein the processing element is configured to modify the payload data based on an indication that the device is configured to uncompress data according to the lossless compression algorithm.

4. The apparatus of claim 1, wherein the one or more specified processing algorithms include an encryption algorithm, and wherein the processing element is configured to encrypt the payload data based on an encryption policy.

5. The apparatus of claim 1, wherein the processing element is configured to create an error check code corresponding to the received payload data, wherein the error check code is usable by the device to determine whether modifying the payload data was performed without errors.

6. The apparatus of claim 1, wherein a packet prefix corresponding to the one or more packets includes the information indicating the one or more specified processing algorithms.

7. The apparatus of claim 1, wherein the apparatus is a peripheral device configured to receive the payload data by accessing one or more computer-readable storage media.

8. The apparatus of claim 1, wherein the apparatus is a communication channel controller configured to send and receive packets over the communication channel according to a first communication protocol.

9. The apparatus of claim 1, wherein the payload data corresponds to a first data format;
wherein the apparatus is configured to, based on an indication that the device requests data in a second data format, modify the received payload data according to an algorithm for converting data in the first data format to data in the second data format.

10. The apparatus of claim 8, wherein at least a portion of the processing element includes programmable hardware;
wherein the programmable hardware includes logic for a plurality of file format conversion algorithms.

11. A computer-readable storage medium having instructions stored thereon that are executable by a processor of a computing device to cause the computing device to perform operations comprising:
receiving a request to transfer application data to a peripheral device coupled to a communication channel of the computing device, wherein the communication channel is configured to transfer packets according to a first communication protocol; and
based on an indication that the peripheral device is configured to take one or more specific actions on modified application data in response to receiving data packets containing application data that has been modified by a processing element in accordance with a specified algorithm:
causing the application data to be modified according to the specified algorithm; and
causing the modified application data to be sent in one or more packets to the peripheral device via the communication channel, wherein the one or more packets are compatible with the first communication protocol.

12. The computer-readable storage medium of claim 11, wherein the operations further comprise sending the application data to a controller that is configured to modify the application data according to the specified algorithm.

13. The computer-readable storage medium of claim 12, wherein the operations further comprise sending information indicating the specified algorithm to the controller.

14. The computer-readable storage medium of claim 12, wherein sending the application data to the controller comprises sending an indication of a memory location in which at least a portion of the application data is stored.

15. The computer-readable storage medium of claim 11, wherein the specified algorithm is a lossless compression algorithm, wherein the first communication protocol is PCI-Express.

16. A method, comprising:
a processing element receiving information indicating that a device coupled to a communication channel that is also coupled to the processing element is configured to take one or more specific actions on any received payload data that has been modified according to one or more specified processing algorithms; and
the processing element, in response to the received information, and in response to receiving data destined for the device:
creating one or more data packets that include modified payload data, wherein the modified payload data is a result of processing the received data according to the one or more specified processing algorithms, wherein the one or more packets are destined to the device; and
causing the one or more packets and information indicating the one or more specified processing algorithms to be transmitted to the device via the communication channel.

17. The method of claim 16, wherein a packet prefix included in at least one of the one or more data packets includes the information indicating the one or more specified data processing algorithms.

18. The method of claim 16, wherein the one or more specified processing algorithms include an encryption algorithm, and wherein the method further comprises modifying the payload data based on an encryption policy.

19. A non-transitory computer readable storage medium comprising a data structure which is usable by a program executable on a computer system to perform a portion of a process to fabricate an integrated circuit including circuitry described by the data structure, the circuitry described in the data structure including:
a processor comprising a processing element that is configured to couple to a communication channel;
wherein the processing element is configured to, in response to information indicating that a device coupled to the communication channel is configured to take one or more specific actions on any received payload data that has been modified according to one or more specified processing algorithms:
modify received payload data according to one or more specified processing algorithms;

create one or more packets, wherein the one or more packets are destined to the device and include the modified payload data and information indicating the one or more specified processing algorithms that were used to modify the payload data; and cause the one or more packets to be transmitted to the device via the communication channel.

20. The non-transitory computer readable storage medium of claim 19, wherein the storage medium stores at least one of HDL, Verilog, or GDSII data.

* * * * *